July 23, 1974 R. H. GORMAN 3,825,461

SPLICING HEAD ASSEMBLY

Filed Jan. 29, 1973 4 Sheets-Sheet 1

SPLICING HEAD ASSEMBLY

Filed Jan. 29, 1973

3,825,461
SPLICING HEAD ASSEMBLY
Robert H. Gorman, Hudson, Mass., assignor to King Instrument Corporation, Hudson, Mass.
Filed Jan. 29, 1973, Ser. No. 327,507
Int. Cl. B65h *69/02*
U.S. Cl. 156—502 18 Claims

ABSTRACT OF THE DISCLOSURE

A splicing head assembly for use in a machine for splicing magnetic tape to a leader attracted to one of the hubs of a cassette, winding a selected amount of tape on that hub, and then attaching the trailing end of the tape to a leader on the other hub of the cassette. The assembly comprises three splicing blocks or tape support elements each having a guideway for aligning tape to be spliced and suction means for holding a tape in position in the guideway. Two of the splicing blocks are spaced vertically and means are provided for producing relative movement between those blocks and the third block so that the guideway of the third block is aligned alternately with the guideways of the other two blocks.

This invention relates to machines for splicing and winding tapes and more particularly to the manufacture of magnetic tape cassettes.

The primary object of this invention is to provide a new and improved apparatus for splicing tape.

A more specific object of this invention is to provide a new splicing head assembly for use in machines for splicing and winding tapes into cassettes.

Another specific object of this invention is to provide a splicing head assembly for machines for splicing and winding magnetic recording tape, the splicing head assembly being compact, fast-acting and particularly adapted for handling video tape.

Still another object of the present invention is to provide a splicing head assembly of the character described that is adapted for use in machines of the type illustrated and described in U.S. Patent Application 154,857, filed June 21, 1971, now U.S. Pat. Nos. 3,717,314, by James L. King for Air Turbine Drive System for Tape Winding and Splicing Machine.

Magnetic tape cassettes usually consist of a cassette case containing two rotatable spools or hubs, a leader attached to each spool or hub, and a predetermined length of magnetic tape having its ends spliced to the two leaders. In the manufacture of such cassettes, the common practice is to start with an empty cassette consisting of the cassette case and a single length of leader tape having one end connected to one hub and the other end connected to the second hub. The first step in filling the cassette with tape is to cut the leader tape to form two discrete leaders. Then the magnetic tape to be wound into the cassette is spliced to one leader and the hub to which the one leader is connected is rotated to wind up a given length of magnetic tape. Thereafter the magnetic tape is cut and the trailing end of the given length of magnetic tape is spliced to the leader attached to the other hub. An alternative procedure is to start with only the two hubs each having a short leader, splice magnetic tape to the leader on one hub, wind a given amount of tape on that one hub, and thereafter splice the trailing tape to the leader on the other hub. Thereafter the two hubs are mounted in the cassette case. Accordingly, still another object of the invention is to provide an improved splicing head which may be used in a machine for splicing-winding tape to leaders on cassette hubs according to the foregoing alternative modes of manufacture.

It has been determined that the splicing head assembly disclosed in U.S. Patent Application Ser. No. 154,857 is not fully satisfactory for handling video magnetic recording tape having a width of about ¾ inch. The splicing head assembly shown in U.S. Patent Application 154,857 is unsuitable for splicing ¾ inch video tape since the latter tape, because of its relatively wide width, will not readily accommodate the extent of lateral movement involved in shifting the movable splicing block so as to selectively align the leaders with the recording tape to be spliced. Accordingly, a further specific object of the splicing head assembly provided by the present invention is to overcome the problems encountered in attempting to splice video tape with the splicing head assembly described in U.S. Patent Application Ser. No. 154,857.

The foregoing objects and other objects which are obvious to persons skilled in the art from the following specification are achieved by providing a splicing head assembly which comprises three splicing blocks or tape support elements. Each splicing block has a guideway for aligning tape to be spliced and is also provided with means whereby suction may be applied to hold a tape in position in the guideway. Two of the splicing blocks are spaced vertically and are mounted in fixed relation to one another, and means are provided for producing relative movement between these two blocks and the third block so that the guideway in the third block is alternately aligned with the guideways of the other two blocks. The splicing head assembly is mounted in a cassette tape splicing and winding machine having a cutter mechanism which includes a knife and is adapted for operation so that its knife will sever any tape extending across from the third block to either of the other two blocks. One of the blocks of the splicing head assembly may also be provided with a magnetic read head for sensing prerecorded "Q" signals when prerecorded tape is being spliced and wound.

Other features and many of the attendant advantages of the invention are set forth or rendered obvious by the following detailed specification which is to be considered together with the accompanying drawings wherein.

Figure 1:
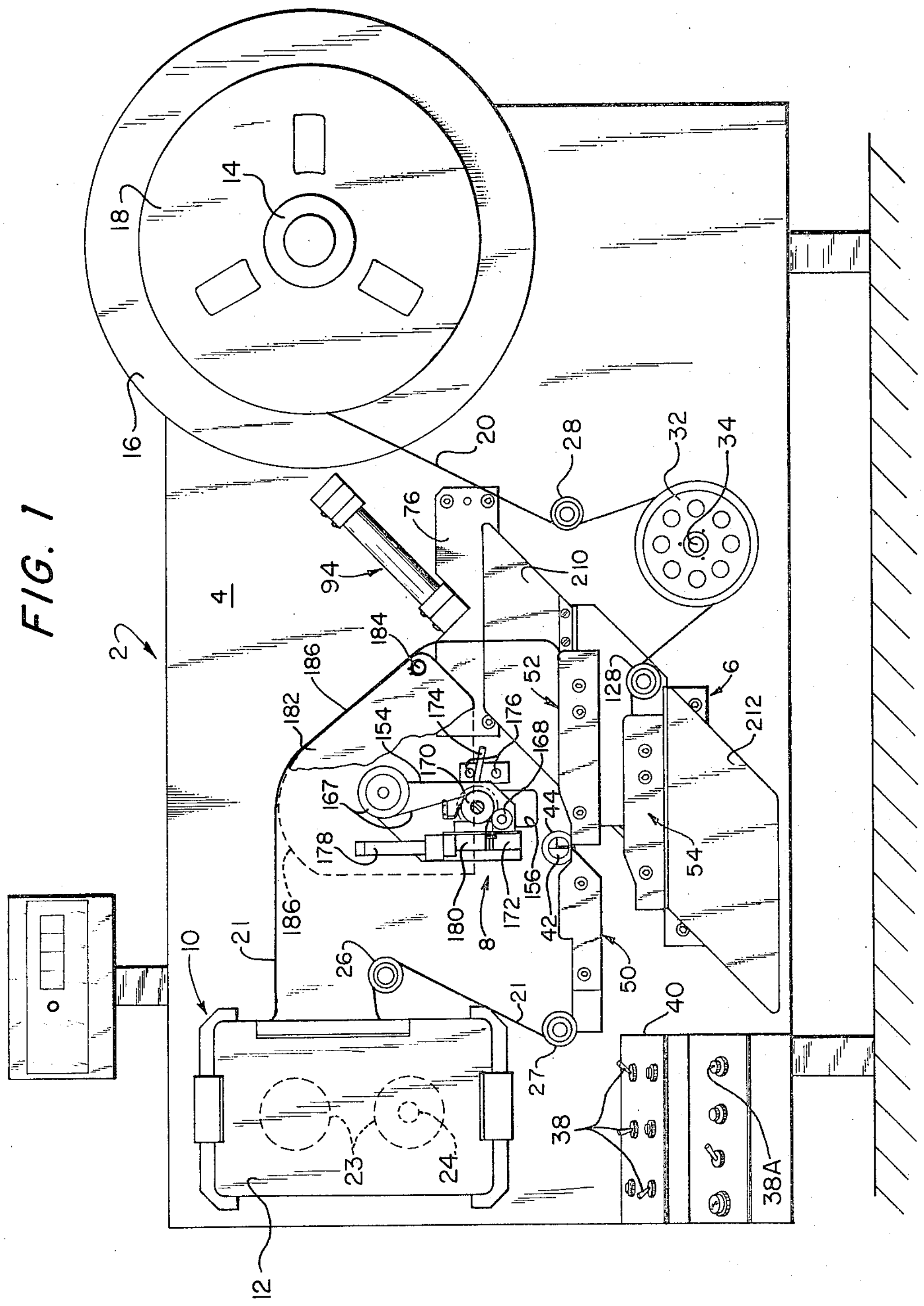
FIG. 1 is a front elevation of a cassette tape winding and splicing machine embodying a splicing head assembly constructed in accordance with this invention.

Turning now to FIG. 1, the illustrated machine comprises a console 2 having a front panel 4 which supports a splicing head assembly 6 constructed in accordance with this invention, a splicing tape dispensing mechanism 8, and a cassette holder 10 that is adapted to hold a cassette 12 which is to be filled with magnetic recording tape. The machine also includes a rotatable shaft (not shown) on which is affixed a hub 14 having a large guide flange 16. Hub 14 supports and is keyed to a reel 18 on which is found a supply of magnetic tape 20 that is to be used in filling cassettes. Also forming part of the machine is a rotatable winding spindle 24 that projects out of front panel 4. Spindle 24 is adapted to mate with and drive one of the two hubs 23 of the cassette mounted in holder 10.

The rotatable shaft supporting hub 14 and the spindle 24 are rotatable supported by bearings (not shown)

mounted in suitable holes in front panel 4 and are connected on the rear side of the panel to suitable rotary drive means (not shown) which may be of any suitable form well known in the art, e.g. electric motors, but preferably comprise two air turbines and associated brake means as described and illustrated in said copending U.S. Patent Application Ser. No. 154,857.

The splicing tape dispensing mechanism is adapted to apply a piece of adhesive splicing tape to the abutting ends of tapes supported by the splicing head assembly as hereinafter described. Preferably it is a unit of the type described and illustrated in said U.S. Application Ser. No. 154,857, but it is to be understood that it may be replaced by some other form of dispensing mechanism capable of performing the same function of dispensing and applying splicing tape. Accordingly, the tape dispensing mehanism 8 is described and illustrated herein only to the extent necessary to facilitate understanding of the mode of operation of the illustrated machine and the nature and advantages of the present invention.

Also rotatably mounted to front panel 4 are three guide rollers 26, 27 and 28 located as shown in FIG. 1, plus a relatively large footage counting wheel 32. The latter is affixed to a shaft 34 that is rotatably supported by bearings (not shown) mounted in panel 4. Means (also not shown) disposed behind panel 4 and including a member mounted to shaft 34 monitor each revolution of counting wheel 32 and for each such revolution, provide a signal that is counted by an electronic counter 36 (FIG. 5) which can be set to provide an output signal to stop the drive means for hub 14 and winding spindle 24 when a predetermined amount of tape (as indicated by the number of counting wheel revolutions counted by the counter) has been transported from the supply reel. The counter preferably is of the type that automatically resets itself when the output signal occurs. Such a system for counting the amount of tape that is wound and stopping transportation of tape is disclosed in said copending U.S. Patent Application Ser. No. 154,857.

Operation of the machine is controlled by a control system which includes a plurality of electrical swiches 38 mounted in a box 40 attached to the front panel 4. Further details of the control system are shown in FIG. 5.

The machine also includes a tape cutting mechanism which comprises a knife holder in the form of an elongate arm 42 that extends through an oversized hole 44 in panel 4. Mounted in the front end of arm 44 is a knife blade 46. Knife blade 46 is mounted with its cutting edge facing down and inclined so that its front end is higher than its rear end. The rear end of arm 42 is affixed to the end of the reciprocal operating rod of a fluid pressure actuator 48 (FIG. 5) which is mounted on the rear side of the panel 4. This form of tape cutting mechanism is disclosed in said copending Application Ser. No. 154,857. The length of arm 42 is such that when the operating rod of the cutter mechanism actuator is in its retracted position, the front end of arm 42 is withdrawn far enough so that the knife blade cannot interfere with movement of tape along the splicing assembly hereinafter described. When the piston rod of the cutting mechanism actuator is extended, the cutting edge of the knife blade slices through whatever tape is extending across between tape support members 50 and either of the tape support members 52 and 54 described below. Since the knife blade edge is inclined, the cutter produces a clean shearing action on the tape being cut.

In the illustrated embodiment, tape support member 50 has a flat top surface 64 with upstanding side flanges moveable. Tape support member 50 is mounted to front panel 4 by means of a support plate 56. The latter has flat vertically extending front and rear surfaces and is secured to panel 4 by screws. Support plate 56 is mounted to one side of the hole 44 and the end thereof that is adjacent to hole 44 has a flat vertically extending surface 58 and a beveled surface 60. Support plate 56 also has a bore 62 which extends through its front and rear surfaces and is counterbored at its front end so as to accommodate an O-ring 63 in the same manner as O-rings 116 are accommodated by carriage plate 106 as described below. The rear end of bore 62 is provided with a fitting 65 (see FIG. 4) that extends through an aligned hole in panel 4 and has attached thereto a hose line as shown that is connected by suitable means to a source of negative air pressure, i.e. a vacuum source such as a vacuum pump.

Figure 5:
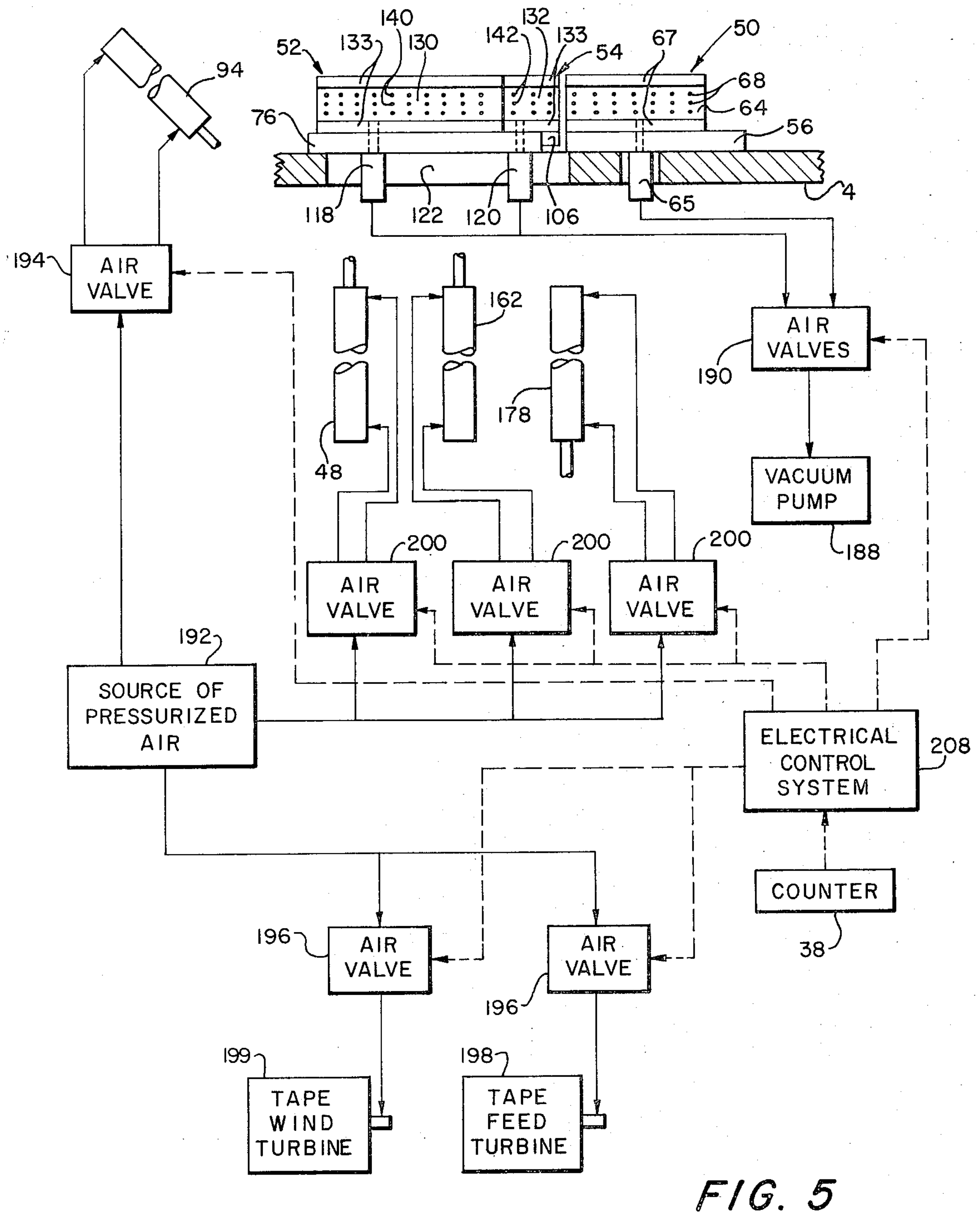
FIG. 5 is a schematic view showing pertinent elements of the control system of the machine.
Figures 3, 4:
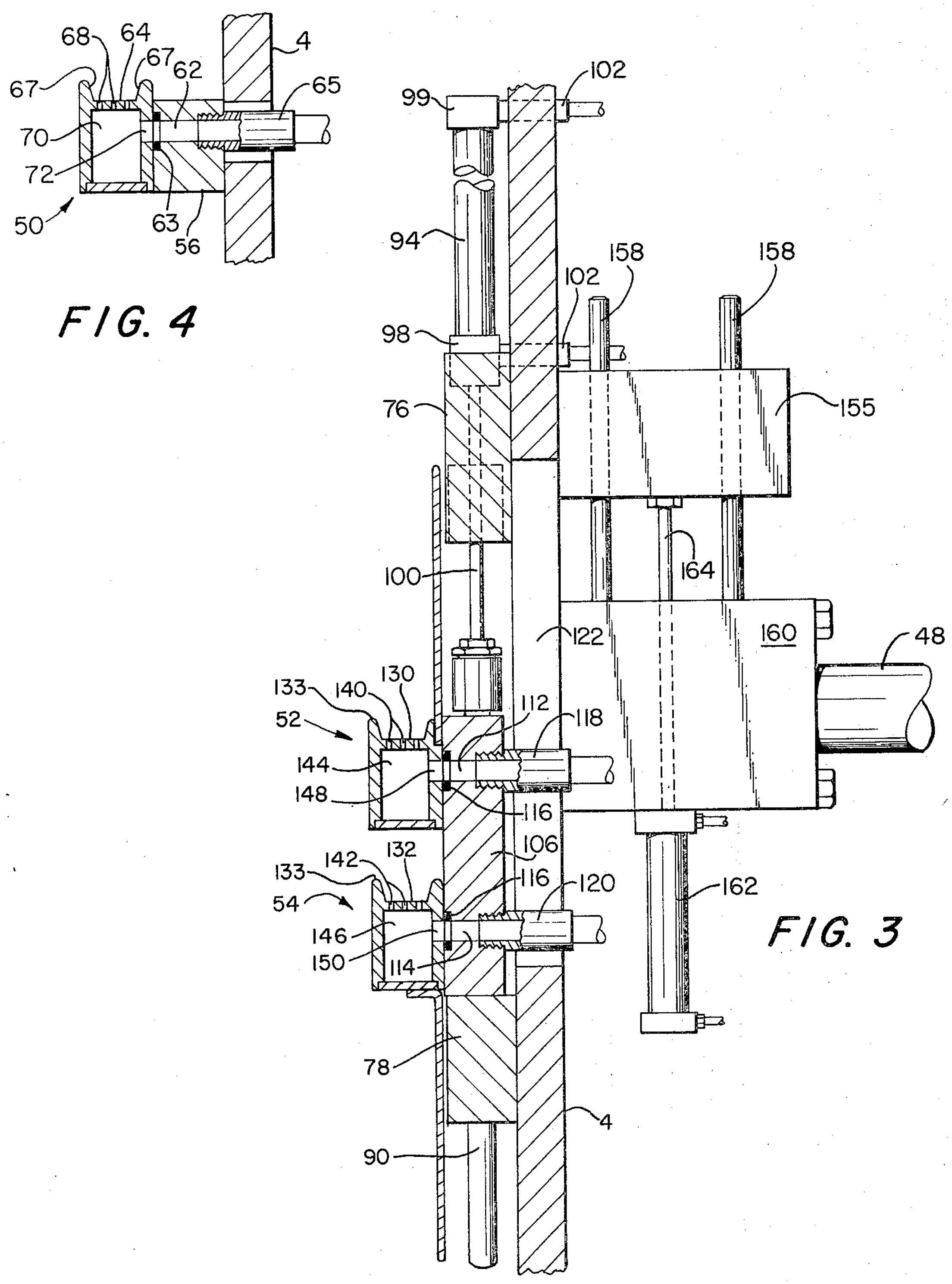
FIG. 3 is an enlarged sectional view taken along line 3—3 of FIG. 2C but including the two shiftable tape support members.
FIG. 4 is an enlarged cross-sectional view taken along line 4—4 of FIG. 2C.

Referring now to FIGS. 4 and 5, tape support member 50 has a flat top surface 64 with upstanding side flanges 67 so as to form a groove to restrain and guide recording and leader tapes. The side flanges are spaced so that the width of the groove is only slightly greater than that of the tapes. Tape support member 50 is affixed to support plate 56 by screws and is mounted so that its upper surface 64 is horizontal and its end nearest the hole 44 has an inclined end surface 66 that extends at an angle of 45° to the vertical and at a right angle to panel 4. Tape support member 50 is provided with a plurality of small holes 68 in its top surface that communicate with an interior passageway or chamber 70. The latter has a port 72 on the rear side of the tape support member which is aligned with bore 62 so that when vacuum is applied via port 72, a suction force is exerted through holes 68 so as to hold a tape resting on the upper surface of tape support member 50. The O-ring 63 is compressed between the adjacent face of support plate 56 and tape support member 50 so as to form a fluid seal.

Figures 2A, 2B, 2C, 2D:
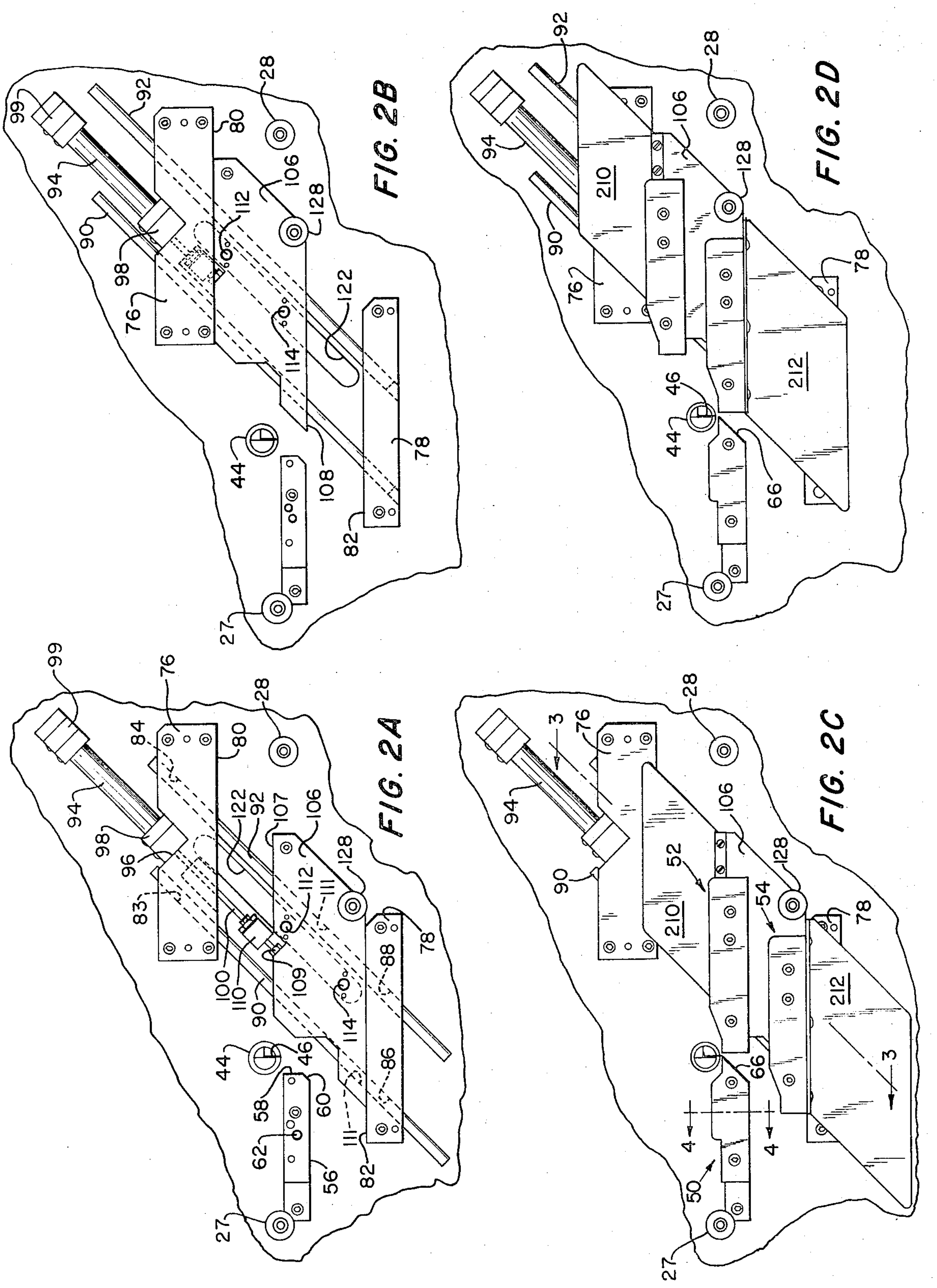
FIGS. 2A and 2B are enlarged front elevations of the splicing head assembly but with the three tape support members omitted.
FIGS. 2C and 2D are views like FIGS. 2A and 2B but including the three tape support members.

Referring now to FIGS. 2A, 2B and 3, the splicing head assembly also comprises two plates 76 and 78 which are affixed to the front panel 4 and are vertically spaced and horizontally offset as shown. The plate 76 has a flat horizontally extending bottom surface 80 and the plate 78 has a flat horizontally extending to surface 82. Plate 76 has two bores 83 and 84 which are inclined at an angle of 45° and which extend from its upper surface to its bottom surface 80. Plate 78 has two correspondingly inclined bores 86 and 88 which are aligned with the bores 83 and 84. Secured in bores 83 and 86 and extending between plates 76 and 78 is a slide rod 90. A second slide rod 92 is correspondingly disposed in the bores 84 and 88.

Also supported by plate 76 is a fluid pressure actuator 94. The upper side of the plate 76 is notched so as to provide a flat surface 96 that extends at a right angle to the slide rods and is engaged by the end face of the end block 98 of actuator 94. Block 98 and the end block 99 at the opposite end of the actuator's cylinder are secured to front panel 4 so that the actuator is inclined with its longitudinal axis extending parallel to rods 90 and 92. The operating piston rod 100 of actuator 94 extends through an oversized hole in plate 76. Actuator 94 may be of the single or double-acting type, but preferaby it is of the double-acting type. Accordingly, the end blocks 98 and 99 each have fittings 102 (FIG. 3) whereby air may be admitted to the opposite ends of the actuator's cylinder. As shown, these fittings extend through suitable holes in front panel 4 and are connected to suitable hose lines which are coupled by valve means to a source of pressurized air as shown in FIG. 5.

Mounted on slide rods 90 and 92 is a carriage 106 having a flat rear face that is spaced from panel 4. The front face of carriage 106 is also flat and vertical. The upper and lower surfaces 107 and 108 of carriage 106 are flat and extend horizontally. Surface 107 is notched as shown to accommodate means for connecting the carriage to the piston rod 102. One of the inclined surfaces defining the notch is provided with a tapped hole in which is screwed a bushing 109. The latter is connected by coupling 110 to the end of piston rod 102 of actuator 94. In this connection it is to be noted that the underside of plate 76 is provided with a counterbore (as indicated in dotted lines) for the oversized hole through which extends the piston rod 102, this counterbore being for the purpose of accommodating coupling 110 when piston rod 102 is withdrawn to the extent necessary to permit the upper surface of the carriage 106 to engage the under surface of plate 76.

The slide rods 90 and 92 extend through parallel inclined bores formed in carriage 106, these bores 111 being made only slightly larger than the slide rods so that the carriage can slide freely thereon with a minimum of lateral play. Carriage 106 also has a pair of transverse bores 112 and 114 (FIG. 3). On the front face of carriage 106, the bores 112 and 114 each have a shallow counterbore to accommodate O-ring seals 116. The depth of the counterbores and the thickness of the seals 116 are such that the seals protrude slightly beyond the front face of the carriage plate. On the rear face of carriage 106, the bores 112 and 114 are tapped to accommodate hose fittings 118 and 120 to which are connected two hose lines leading to a source of vacuum located behind the front panel 4. For this purpose, the front panel is formed with an elongate slot 122 which is inclined and aligned with bores 112 and 114 so that the fittings 118 and 120 and the hose lines which are connected thereto can move along the slot as carriage 106 is reciprocated as described hereinafter. The carriage has upper and lower limit positions that are determined by its engagement with support plates 76 and 78 respectively (see FIGS. 2A and 2B). Another idler roller 128 is mounted to the carriage so as to move with it from one to the other of its two limit positions.

Splicing blocks or tape support members 52 and 54 are affixed to carriage 106 by a plurality of screws. These tape support members are substantially alike and have flat top surfaces 130 and 132 respectively and like upstanding opposite edge flanges 133 so as to form grooves like that of tape support member 50 for retaining and guiding recording and leading tapes. The end surfaces of tape support members 52 and 54 that are nearest to cutter mechanism aperture 44 extend vertically as shown. Tape support members 52 and 54 are offset horizontally as shown. However, all three tape support members are disposed so that their tape grooves are aligned in a common vertical plane. The offset relation of tape support members 52 and 54 and the disposition of slide rods 90 and 92 and carriage 106 are such that when the carriage is moved to its upper limit position, the tape groove of tape support member 54 is horizontally aligned with the tape groove of tape support member 50 and the adjacent end edges of their upper surfaces are separated by a narrow gap as shown. When the carriage is moved to its lower limit position, the tape groove of tape support member 52 is similarly aligned with the tape groove of member 50 and a corresponding narrow gap exists between the adjacent end edges of their upper surfaces.

The tape support members 52 and 54 also have small holes 140 and 142 in their upper surfaces that lead to internal chambers or passageways 144 and 146. Formed in the rear sides of these tape support members 52 and 54 are ports 148 and 150 for passageways 144 and 146. Ports 148 and 150 are aligned and communicate with bores 112 and 114, with the result that vacuum may be applied to create a suction force through holes 140 and 142 to hold down tapes positioned in the grooves of these two tape support members. The O-rings 116 provide a fluid-tight seal between ports 148 and 150 and bores 112 and 114.

As previously noted, the splicing tape dispensing unit 8 is described in said U.S. Patent Application Ser. No. 154,857 and is not part of the present invention. Nevertheless, certain features thereof will now be described in order for the reader to better understand the nature and advantages of this invention.

The tape dispensing unit comprises a carriage plate 154 that is attached to an arm 155 that projects through a vertical slot 156 in front panel 4 and is slidably mounted on a pair of vertical slide rods 158 affixed to a block 160 attached to the rear side of panel 4. Attached to the underside of block 160 is a pneumatic actuator 162 whose piston rod 164 extends through an oversized hole in block 160 and is attached to arm 155. Actuator 162 is of the double-acting type and serves to reciprocate arm 155. Also affixed to block 160 is actuator 48 whose piston rod (not shown) extends through an oversized horizontal bore in the block. Actuator 48 forms part of the cutter mechanism with the knife support arm 42 attached to the opposite end of its piston rod.

Carriage plate 154 is adapted to rotatably support a roll of adhesive splicing tape 167 and has a pair of feed rolls 168 and 170 for feeding the tape into a vertical channel 172. It also supports unidirectional drive means (not shown) for causing feed rolls 168 and 170 to rotate counterclockwise and clockwise respectively (as seen in FIG. 1) when the carriage plate is moving upwardly and to prevent rotation of the feed rolls when the carriage plate moves downwardly. Operation of the drive means is achieved by an arm 174 that is connected to a rotatable member of the drive means and extends between two vertically spaced pins 176 affixed to front panel 4. Vertical movement of the carriage plate causes arm 174, by virtue of being retarded by one of the pins 176, to rotate the rotatable member in a direction determined by the direction of movement of the carriage plate. However, the drive means is adapted to be operated only when arm 174 rotates clockwise (as seen in FIG. 1). Also attached to the carriage plate is a fluid pressure actuator 178 whose piston rod is connected to a plunger 180 that is mounted in channel 172. The bottom end of plunger 180 is adapted so that when it is driven downward in the channel by actuator 178, it will sever the splicing tape in the channel at the side where it is fed in by the feed rolls and will carry the severed section of splicing tape downward in the channel for application to the adjacent ends of two tapes to be spliced. Actuator 178 is operated only when the carriage plate has been moved down to its lower tape applicating position, with plunger 180 being raised before or as the carriage plate is restored to its higher at-rest position.

Further details of the splicing tape dispenser-applicator may be found in said U.S. Application Ser. No. 154,857.

In normal operation of the illustrated machine, the splicing tape dispenser applicator is partially hidden by a cover member 182 that is open at its bottom and rear sides and is pivotally attached to panel 4 by a pivot pin 184. The upper surface 186 of this cover member is curved and inclined as shown to serve as a guide for a portion of the leader tape of an empty cassette newly installed in the cassette holder.

FIG. 5 schematically illustrated the control system for the machine to the extent necessary to adequately describe and claim the present invention. In this figure, full lines represent air lines and the broken lines represent electrical connections. Suction for holding tapes on the splicing blocks 50, 52 and 54 is achieved by means of a vacuum pump 188 which is connected to hose fittings 65, 118 and 120 via on-off solenoid controlled air valves represented schematically at 190. Air for operating the splicing head shifting actuator 94 is applied from a pressure source 192 via a solenoid air valve 194 that is adapted to selectively apply air to one or the other ends of the actuator's cylinder. The source of pressurized air 192 also is connected by other solenoid air valve units shown schematically at 196 for operating a tape feed turbine 198 that drives the shaft on which hub 14 is mounted and a tape wind turbine 199 that drives spindle 24. Although not shown, the turbines include braking means for stopping rotation of hub 14 and spindle 24 when flow of air to the turbines is terminated. Three additional solenoid air valves 200 are provided for coupling pressurized air from source 192 to actuators 48, 162, and 178 for operating the splicing tape dispenser-applicator and the cutter mechanism. Operation of the valves 194, 196, 200, 202, and 204 so as to effect the sequential operation described below is effected by a suitable electromechanical control system shown schematically at 208 which is adapted to start operation of the machine when a selected one of switches 38 is closed and to stop winding recording tape in response to the signal output of counter 36 which occurs when counting wheel 32 has made a predetermined number of revolutions. Obviously, the control system and the actuating elements controlled thereby may take other forms, e.g., the air actuators may be replaced by hydraulic or solenoid type actuators.

The manner in which the splicing head assembly of the present invention is employed when the machine is operated to load a cassette with magnetic tape will now be described. In this connection it is to be noted that certain of the control switches 38 are toggle switches and are connected so as to permit independent and selective operation of the air valves whereby (a) the cutter and tape dispensing mechanism may be operated independently, and (b) actuator 94 also may be operated independently so that splicing blocks 52 and 54 may be shifted to and held in either of their two limit positions. Initially, the splicing blocks 52 and 54 are positioned by operating actuator 94 through actuation of one of the switches 38 so that splicing block 54 is aligned with splicing block 50 (FIG. 2D). Then magnetic tape is paid off manually from the supply reel and passed around guide roller 28 and counting wheel 32 and guide roller 128 and placed in the groove of tape support member 54, as shown in FIG. 1. The tape is extended so as to project beyond the gap between the splicing head 54 and the splicing head 50. Then another one of the switches 38 is operated to cause actuator 48 to reciprocate knife support arm 42 so that the knife blade will cut the tape whereby it will have a sharp end suitable for splicing purposes. The severed portion of tape is removed manually from the machine. Then the switch 38 controlling actuator 94 is operated so as to cause splicing blocks 52 and 54 to be shifted again so that the splicing block 52 is aligned with splicing block 50. Thereafter, the leader 21 wound on the two hubs of the empty cassette is pulled out to form a relatively large loop and this loop is passed over the curved upper surface 186 of cover 182, down along the grooves of splicing blocks 52 and 50 and around guide rollers 27 and 26 as shown in FIG. 1. During the foregoing operations, vacuum is being applied to the three splicing blocks so that the recording tape and the leader tapes will be held in the grooves of the splicing blocks. This vacuum may be continued without interruption as long as the machine is being operated.

Thereafter, the start button switch 38A is closed to initiate operation of the machine under the control of the control system 208. The automatic control system then causes the machine to operate according to the following sequence: The knife mechanism is actuated so as to sever the loop of leader tape at the gap between the splicing blocks 50 and 52. Then as soon as the arm of the cutter mechanism has retracted into the aperture 44, actuator 94 is supplied with air so as to cause the splicing blocks 52 and 54 to shift to their upper limit positions wherein the groove of splicing block 54 is aligned with the groove of splicing block 50. As soon as this has occurred, the splicing tape dispenser unit 8 is operated. The carriage plate 154 of the splicing tape dispenser moves downwardly so that it is close to or lightly engages the tapes resting in the grooves of splicing blocks 50 and 54, at which point actuator 178 is caused to move plunger 180 downward, whereupon a section of splicing tape is severed and driven downward by the plunger onto the adjacent ends of the leader and the magnetic tape supported by splicing blocks 50 and 54 so that a splice is made. The plunger is immediately retracted, and as this occurs, carriage plate 154 is also retracted to its original raised position. Once the tape 20 has been spliced to the leader 21 supported by splicing block 50, the tape feed turbine 198 and tape wind turbine 199 are operated to drive spindle 24 and hub 14 in a direction to wind tape into the cassette. Although vacuum is continually applied to the grooves of splicing heads 50 and 54 as tape is being wound into the cassette, the suction effect does not prevent the tape from being pulled along the grooves by rotation of the spindle. Alternatively, if desired, the vacuum may be turned off with respect to the grooves of splicing heads 50 and 54 during the winding operation. Once a predetermined amount of magnetic tape has been wound into the cassette (as measured by the number of revolutions of the counting wheel 32 counted by the counter), the turbines are stopped. Thereafter, the cutter mechanism is again actuated so as to cause its cutter blade to sever the magnetic tape along the line of separation between splicing blocks 50 and 54. Then actuator 94 is caused to shift the splicing blocks 52 and 54 downward to their lower limit position so that the groove of splicing block 52 is aligned with that of splicing block 50. Once this has occurred, the splicing tape dispensing unit 8 is again actuated so as to apply a section of splicing tape to abutting ends of the trailing end of the magnetic tape resting in the groove of splicing block 50 and the leader resting in the groove of splicing block 52. Thereafter, the leader supported by splicing block 52 and the tape attached thereto are lifted off splicing blocks 50 and 52, cover plate 182 and guide rollers 26 and 27, and the cassette is removed from holder 10. One of the hubs of the cassette is then rotated so as to draw all of the tape into the casette. A new cassette is then installed in the holder with its leader pulled out and positioned over cover 182 and guide rollers 26 and 27 and installed in the grooves of the splicing blocks 50 and 52. Thereafter, the start button switch 38A is again closed to actuate the machine whereby it will carry out the cutting, splicing and winding operations in the automatic manner described above.

It is common practice in the manufacture of cassettes to load the cassettes with tape bearing a series of identical recordings, e.g. a series of programs with a "Q" signal recorded between each program. For winding cassettes with prerecorded tape so that each cassette contains a single program, it is preferred to provide means for sensing the occurrence of a Q signal. Such means may take the form of a magnetic read head (not shown) mounted in a cavity in the upper surface of splicing block 54 (or splicing block 50) and disposed so as to be lightly engaged by the magnetic tape 20 as the tape is being wound into the cassette. When the magnetic read head senses a Q signal, associated electronic means (not shown) coupled to the read head will produce an output signal to sequentially operate the valving mechanism which controls the supply of air to the two turbines and also brake mechanisms associated with the turbines so as to stop the winding operation, and permit the machine to sequentially cut the magnetic tape, shift the splicing heads 52 and 54, and then splice the trailng end of the magnetic tape previously wound into the cassette to the leader supported by the splicing block 52. Obviously, when winding prerecorded tape, the counter is shut off.

The splicing head assembly of the present invention also includes a further feature. This feature consists of two guard plates 210 and 212 which are mounted for movement with carriage 106. Plate 210 is mounted to the front face of carriage 106 adjacent its upper surface and extends in a vertical plane upwardly in front of the slide rods 90 and 92. Plate 212 is attached to the underside of splicing block 54 adjacent the front face of carriage 106 and extends vertically downward in front of the bottom end of slide rods 90 and 92 and also in front of support plate 78. These plates function as guards so as to prevent the operator from inserting his hand between the carriage on the one hand and support plates 76 and 78 on the other hand. The length of these plates are such that when the splicing blocks 52 and 54 are in their lower limit position (FIG. 2C) the upper edge of plate 210 extends above the lower edge of the support plate 76, and when the carriage plate is in its upper limit position, the lower edge of plate 212 extends below the upper surface of the lower support plate 78. The left and right hand edges of these plates, as seen in FIG. 1, are slanted as shown so as to assure that they will not interfere with shifting of the splicing blocks.

The tape support assembly herein described offers a number of advantages including the obvious ones of simplicity of construction, reliability and ease of maintenance. Furthermore, and most importantly, the illustrated splicing block assembly is adapted to support and shift relatively wide magnetic tape such as video tape so as to minimize tape edge damage and to facilitate adequate splicing of the same by means of pressure sensitive adhesive splicing tape. Because of the nature of its construction and its mode of shifting, the quality of the splice made with the illustrated splicing head assembly is consistently high in compliance with existing requirements of the magnetic tape cassette industry.

What is claimed is:

1. A splicing head assembly for use in splicing a recording tape to leader tapes comprising:

- a first tape support member having a tape-supporting surface and means cooperating with said tape-supporting surface to define a guideway for a tape supported on said surface;
- second and third tape support members each having a tape-supporting surface and means cooperating with said tape-supporting surface to define a guideway for a tape supported on said surface, said second and third tape support means being fixed relative to one another so that their tape-supporting surfaces and the tape-supporting surface of said first member extend substantially parallel to one another and so that their guideways and the guideway of said first tape support members reside in a common plane;
- means for releasably holding a tape in position along each guideway; and
- means for providing relative reciprocal movement between said first member on the one hand and said second and third members on the other hand along an axis extending transversely of said tape-supporting surfaces in said common plane so as to alternately align one end of the tape-supporting surface of said first member with the adjacent ends of the tape-supporting surfaces of said second and third members.

2. A splicing head assembly according to claim 1 wherein corresponding ends of the tape supporting surfaces of said second and third members are located in a second plane that extends at an oblique angle to said surfaces, and further wherein said axis is parallel to said second plane.

3. A splicing head assembly according to claim 1 wherein corresponding ends of the tape-supporting surfaces of said second and third tape-supporting members are offset horizontally.

4. A splicing head assembly according to claim 1 wherein the adjacent ends of said first, second and third tape support members have inclined surfaces that extend parallel to said axis.

5. A splicing head assembly according to claim 1 wherein said first member is fixed and said second and third members are moveable as a unit relative to said first member.

6. A splicing head assembly according to claim 5 including a fixed support, slide means affixed to said second and third members and slidably connected to said fixed support for movement along said axis, and drive means affixed to said fixed support and connected to said slide means for moving said second and third members back and forth along said axis.

7. A splicing head assembly according to claim 6 wherein said drive means is a fluid actuator.

8. A splicing head assembly according to claim 5 comprising a plate, means securing said first tape support member to said plate, and means attached to said plate supporting said second and third members for movement along said axis.

9. A splicing head assembly according to claim 8 wherein said means for holding a tape in position along each guideway of said second and third members comprises at least one hole in the tape-supporting surface of each of said second and third elements, an internal passageway in each of said memebrs leading to said at least one hole, and means for connecting said passageways to a source of vacuum whereby to apply a suction force to tapes disposed on the tape-supporting surfaces of said second and third members.

10. A splicing head assembly according to claim 9 further including an elongate slot in said plate, and said means for connecting said passageways to a source of vacuum comprises tubular means extending through said slot and adapted to be connected to said source of vacuum, said tubular means being moveable in said slot with movement of said second and third members along said axis.

11. A splicing head assembly according to claim 1 wherein said means for releasably holding a tape comprises means for applying suction to tapes supported on the tape-supporting surfaces of said members.

12. A splicing head assembly comprising first, second and third splicing blocks, a support for said splicing blocks, means securing said first block to said support, an actuator mounted to said support having a reciprocal operating member and adapted to move said operating member from one to the other of first and second positions, means attached to said support mounting said second and third blocks for movement in a vertical plane, means connecting said operating member to said second and third blocks so that said second and third blocks move with said operating member, said first block having first tape guide means for positioning a first tape on said first block, and said second and third blocks having second and third tape guide means for positioning second and third tapes on said second and third blocks respectively so that one of said second and third tapes is aligned with the tape positioned on said first block when said operating member is in one of said first and second positions and the other of said second and third tapes is aligned with the tape positioned on said first block when said operating member is shifted to the other of said first and second positions.

13. A splicing head assembly according to claim 12 wherein said first, second and third tape guide means each comprise flat-bottom grooves, said grooves all extending horizontally in a common vertical plane, and further wherein the grooves of said second and third blocks are spaced vertically from one another and have corresponding end edges that are aligned with an axis that extends parallel to the axis of movement of said reciprocal operating member, the groove of said first block having an end edge disposed so as to be immediately adjacent to the corresponding end edge of the groove of one of said second and third blocks when said operating member is in one of said first and second positions and immediately adjacent to the corresponding end edge of the groove of the other of said second and third blocks when said operating member is in the other of said first and second positions.

14. A splicing head assembly according to claim 13 wherein said axis of movement is inclined.

15. A splicing head assembly according to claim 12 wherein said means mounting said second and third blocks for movement comprises a carriage to which said second and third blocks are affixed in vertical spaced relation to each other, first and second spaced plates attached to said support, and slide rod means affixed to and extending between said plates, said carriage being slidably mounted on said rods and being connected to said reciprocal operating member for movement with said operating member.

16. A splicing head assembly according to claim 15 wherein said first and second spaced plates comprise stop means for said carriage that determine said first and second positions of said reciprocal operating member.

17. A splicing head assembly according to claim 15 wherein said actuator is affixed to one of said first and second spaced plates.

18. A splicing head assembly according to claim 15 wherein said slide rod means are inclined.

References Cited

UNITED STATES PATENTS

| | | | |
|---|---|---|---|
| 3,737,358 | 6/1973 | King | 156—502 |
| 3,582,009 | 6/1971 | Ceroll | 156—506 |
| 3,770,551 | 11/1973 | Ceroll | 156—506 |

WILLIAM A. POWELL, Primary Examiner

B. J. LEITTEN, Assistant Examiner

U.S. Cl. X.R.

156—506; 242—56